(12) United States Patent
Sugimoto

(10) Patent No.: US 8,835,557 B2
(45) Date of Patent: Sep. 16, 2014

(54) POLYMER COMPOSITION FOR INNER LINER AND PNEUMATIC TIRE USING THE SAME

(75) Inventor: Mutsuki Sugimoto, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 58 days.

(21) Appl. No.: 12/877,407

(22) Filed: Sep. 8, 2010

(65) Prior Publication Data

US 2011/0077357 A1    Mar. 31, 2011

(30) Foreign Application Priority Data

Sep. 30, 2009    (JP) ................. 2009-227506

(51) Int. Cl.
| | |
|---|---|
| C08L 53/00 | (2006.01) |
| B60C 1/00 | (2006.01) |
| C08L 53/02 | (2006.01) |
| C08L 23/08 | (2006.01) |

(52) U.S. Cl.
CPC ............. B60C 1/0008 (2013.04); C08L 53/025 (2013.01); *C08L 23/0861* (2013.01); *C08L 2205/03* (2013.01)
USPC .............................................. 525/56; 525/89

(58) Field of Classification Search
USPC ....................................................... 525/89, 56
See application file for complete search history.

(56) References Cited

U.S. PATENT DOCUMENTS

| | | | |
|---|---|---|---|
| 4,910,321 A | | 3/1990 | Kennedy et al. |
| 4,946,899 A | * | 8/1990 | Kennedy et al. ............. 525/244 |
| 5,219,948 A | | 6/1993 | Storey et al. |
| 2002/0155238 A1 | * | 10/2002 | Shachi et al. ................ 428/36.6 |
| 2004/0031550 A1 | | 2/2004 | Kanenari et al. |
| 2008/0249236 A1 | | 10/2008 | Nakashima et al. |
| 2010/0263778 A1 | | 10/2010 | Lesage et al. |

FOREIGN PATENT DOCUMENTS

| | | |
|---|---|---|
| JP | 62-48704 A | 3/1987 |
| JP | 64-62308 | 3/1989 |
| JP | 3-174403 A | 7/1991 |
| JP | 6-107896 A | 4/1994 |
| JP | 9-165469 A | 6/1997 |
| JP | 10-508888 A | 9/1998 |
| JP | 2005-105164 A | 4/2005 |
| JP | 2005-344030 A | 12/2005 |
| JP | 2007-291256 A | 11/2007 |
| JP | 2009-73929 A | 4/2009 |
| JP | 2009-149711 A | 7/2009 |
| JP | 2010-100675 A | 5/2010 |
| WO | WO 96/15156 A2 | 5/1996 |
| WO | WO 03/029029 A1 | 4/2003 |
| WO | WO 2005/033035 A1 | 4/2005 |
| WO | WO 2008/004028 A2 | 1/2008 |
| WO | WO 2009/007064 A1 | 1/2009 |

OTHER PUBLICATIONS

Tawara et al., electronic translation of JP 06-107896 (Apr. 1994).*
Hiroharu et al., electronic translation of specifcation of JP 2010-100675 (May 2010).*
Hiroharu, electronic translation of specifcation of JP 2009-073929 (Apr. 2009).*
Office Action dated Aug. 9, 2011 for corresponding Japanese Application No. 2009-227506.

* cited by examiner

*Primary Examiner* — Jeffrey Mullis
(74) *Attorney, Agent, or Firm* — Birch, Stewart, Kolasch & Birch, LLP

(57) ABSTRACT

An object of the present invention is to provide a polymer composition for an inner liner, that is excellent in air permeation resistance and adhesion with an adjacent rubber, and a pneumatic tire using the same. In the polymer composition for an inner liner, a polymer component contains 99 to 50% by mass of a styrene-isobutylene-styrene triblock copolymer, and at least one of a styrene-isoprene-styrene triblock copolymer and a styrene-isobutylene diblock copolymer in a total amount of 1 to 50% by mass.

12 Claims, 1 Drawing Sheet

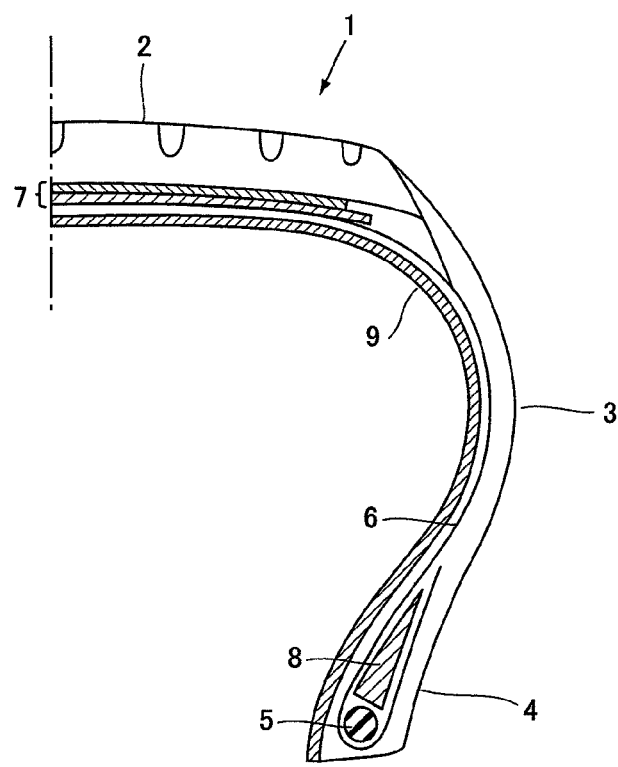

POLYMER COMPOSITION FOR INNER LINER AND PNEUMATIC TIRE USING THE SAME

This nonprovisional application is based on Japanese Patent Application No. 2009-227506 filed on Sep. 30, 2009 with the Japan Patent Office, the entire contents of which are hereby incorporated by reference.

BACKGROUND OF THE INVENTION

1. Field of the Invention

The present invention relates to a polymer composition for an inner liner, and a pneumatic tire using the same.

2. Description of the Background Art

Recently, an attempt has been made to perform weight saving of tires because of strong social demands for fuel economy of automobiles. An attempt has also been made to perform weight saving of inner liners, among tire members, that are disposed inside tires and have the function of improving air permeation resistance by decreasing the amount of air leaked to the outside from the inside of pneumatic tires (air permeation amount).

In a rubber composition for an inner liner, an improvement in air permeation resistance of tires is performed by using a butyl-based rubber containing 70 to 100% by mass of a butyl rubber and 30 to 0% by mass of a natural rubber. The butyl-based rubber contains, in addition to butylene, about 1% by mass of isoprene, that enables cocrosslinking with an adjacent rubber along with sulfur, a vulcanization accelerator and zinc white. In the case of a conventional formulation, the butyl-based rubber requires the thickness of about 0.6 to 1.0 mm for tires for passenger cars, or the thickness of about 1.0 to 2.0 mm for trucks and buses. In order to perform weight saving of tires, there is proposed a polymer which is more excellent in air permeation resistance than the butyl-based rubber and can further decrease the thickness of the inner liner layer.

Japanese Patent Laying-Open No. 2007-291256 proposes, as a pneumatic tire that can simultaneously realize suppression of air pressure drop, improvement in durability and improvement in fuel efficiency, a pneumatic tire using a rubber composition for an inner liner, containing an ethylene-vinyl alcohol copolymer represented by the following general formula (1):

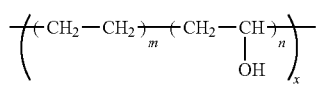

wherein m and n each independently represent 1 to 100 and x represents 1 to 1000, in the amount within a range from 15 to 30 parts by mass based on 100 parts by mass of a rubber component composed of a natural rubber and/or a synthetic rubber, in an inner liner layer. However, the technique of Japanese Patent Laying-Open No. 2007-291256 leaves much room for improvement in respect of weight saving of tires since a rubber sheet using the rubber composition has a thickness of 1 mm.

Japanese Patent Laying-Open No. 09-165469 proposes a pneumatic tire in which adhesion between an inner liner and a rubber composition constituting the inner surface of the tire or a carcass layer can be improved by forming an inner liner layer using nylon with low air permeability. However, the technique of Japanese Patent Laying-Open No. 09-165469 has a problem that a rubber cement composed of a rubber composition must be bonded after subjecting a nylon film to an RFL treatment so as to form a nylon film layer, resulting in complicated steps.

SUMMARY OF THE INVENTION

An object of the present invention is to provide a polymer composition for an inner liner, that is excellent in air permeation resistance and adhesion with an adjacent rubber, and a pneumatic tire using the same.

The present invention provides a polymer composition for an inner liner, wherein a polymer component contains 99 to 50% by mass of a styrene-isobutylene-styrene triblock copolymer, and at least one of a styrene-isoprene-styrene triblock copolymer and a styrene-isobutylene diblock copolymer in a total amount of 1 to 50% by mass.

In the polymer composition for an inner liner according to the present invention, preferably, the polymer component further contains 1 to 30% by mass of an ethylene-vinyl alcohol copolymer.

In the polymer composition for an inner liner according to the present invention, preferably, the styrene-isobutylene-styrene triblock copolymer contains 10 to 30% by mass of a styrene unit and has a weight average molecular weight of 50,000 to 400,000.

In the polymer composition for an inner liner according to the present invention, preferably, the styrene-isoprene-styrene triblock copolymer contains 10 to 30% by mass of a styrene unit and has a weight average molecular weight of 100,000 to 290,000.

In the polymer composition for an inner liner according to the present invention, preferably, the styrene-isobutylene diblock copolymer is linear, contains 10 to 35% by mass of a styrene unit and has a weight average molecular weight of 40,000 to 120,000.

In the polymer composition for an inner liner according to the present invention, preferably, the ethylene-vinyl alcohol copolymer contains 25 to 50 mol % of an ethylene unit.

The present invention provides a pneumatic tire using the polymer composition for an inner liner.

According to the present invention, it is possible to provide a polymer composition for an inner liner, that is excellent in air permeation resistance and adhesion with an adjacent rubber, and a pneumatic tire using the same.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a schematic sectional view showing the right half of a pneumatic tire in one embodiment of the present invention.

DESCRIPTION OF THE PREFERRED EMBODIMENTS

Polymer Composition for Inner Liner

In one embodiment of the present invention, regarding a polymer composition for an inner liner, a polymer component contains 99 to 50% by mass of a styrene-isobutylene-styrene triblock copolymer (hereinafter may also be referred to as an SIBS), and at least one of a styrene-isoprene-styrene triblock copolymer (hereinafter may also be referred to as an SIS) and a styrene-isobutylene diblock copolymer (hereinafter may also be referred to as an SIB) in a total amount of 1 to 50% by mass.

<Styrene-Isobutylene-Styrene Triblock Copolymer>

Because of an isobutylene block of the SIBS, a polymer composition containing the SIBS has excellent air permeation resistance. Therefore, when the polymer composition containing the SIBS is used as an inner liner, a pneumatic tire having excellent air permeation resistance can be obtained.

Furthermore, the SIBS has excellent durability since a molecular structure other than those of aromatic molecules is completely saturated and therefore deterioration and hardening are suppressed. Therefore, when the polymer composition containing the SIBS is used as the inner liner, a pneumatic tire having excellent durability can be obtained.

When a pneumatic tire is produced by applying the polymer composition containing the SIBS for an inner liner, a halogenated rubber having high specific gravity, which has hitherto been used so as to impart air permeation resistance, such as a halogenated butyl rubber, is not used in order to ensure air permeation resistance by the addition of the SIBS. Also when the halogenated rubber is used, it is possible to decrease the amount of use. Therefore, weight saving of the tire can be performed and the effect of improving fuel efficiency can be obtained.

In the polymer component, the content of the SIBS is from 99 to 50% by mass. When the content of the SIBS is 50% by mass or more, an inner liner having excellent air permeation resistance and durability can be obtained. When the content of the SIBS is 99% by mass or less, an inner liner having excellent adhesion with an adjacent rubber can be obtained. Since air permeation resistance and durability become more satisfactory, the content of the SIBS is preferably from 90 to 60% by mass.

Although there is no particular limitation on the molecular weight of the SIBS, the weight average molecular weight obtained by the GPC measurement is preferably from 50,000 to 400,000 in view of fluidity, processability and rubber elasticity. When the weight average molecular weight is less than 50,000, rubber elasticity may deteriorate. In contrast, when the weight average molecular weight is more than 400,000, fluidity may deteriorate, resulting in deterioration of processability. Therefore, both cases are not preferred.

The SIBS usually contains 10 to 40% by mass of a styrene unit. Since air permeation resistance and durability become more satisfactory, the content of the styrene unit in the SIBS is preferably from 10 to 30% by mass.

In the SIBS, a molar ratio of an isobutylene unit to a styrene unit (isobutylene unit/styrene unit) is preferably from 40/60 to 95/5 in view of the rubber elasticity of the copolymer. In the SIBS, the polymerization degree of each block is preferably from about 10,000 to 150,000 for an isobutylene block, or preferably from about 5,000 to 30,000 for a styrene block, in view of the rubber elasticity and handling (when the polymerization degree is less than 10,000, a liquid is obtained).

The SIBS can be obtained by a conventional polymerization method of a vinyl-based compound and, for example, it can be obtained by a living cationic polymerization method.

For example, Japanese Patent Laying-Open No. 62-048704 and Japanese Patent Laying-Open No. 64-062308 disclose that living cationic polymerization of isobutylene with other vinyl compounds can be performed and a polyisobutylene-based block copolymer can be produced by using isobutylene and other compounds as the vinyl compound. In addition, the method for production of a vinyl compound polymer by a living cationic polymerization method is described, for example, in U.S. Pat. No. 4,946,899, U.S. Pat. No. 5,219,948 and Japanese Patent Laying-Open No. 03-174403.

The SIBS does not have a double bond other than an aromatic double bond in the molecule and has high stability to ultraviolet rays as compared with a polymer having a double bond in the molecule, for example, polybutadiene, and therefore has satisfactory weatherability. Furthermore, although it does not have a double bond in the molecule and is a saturated rubbery polymer, a refractive index (nD) at 20° C. of light having a wavelength of 589 nm is 1.506, as described in Polymer Handbook, Willy, 1989. This is significantly higher than that of other saturated rubbery polymers, for example, an ethylene-butene copolymer.

<Styrene-Isoprene-Styrene Triblock Copolymer>

Since an isoprene block of the SIS is a soft segment, a polymer composition containing the SIS is easily vulcanization-bonded with a rubber component. Therefore, when the polymer composition containing the SIS is used as the inner liner, the inner liner is excellent in adhesion with an adjacent rubber constituting a carcass or an insulation, and thus a pneumatic tire having excellent durability can be obtained.

In the polymer component, the total of the content of the SIS and the content of a styrene-isobutylene diblock copolymer described hereinafter is from 1 to 50% by mass. When the total of the contents of the SIS and the SIB is less than 1% by mass, in the case a polymer composition for an inner liner containing the polymer component is used as the inner liner, adhesion with an adjacent rubber may deteriorate. When the content exceeds 50% by mass, air permeation resistance may deteriorate. The content is more preferably from 5 to 45% by mass.

Although there is no particular limitation on the molecular weight of the SIS, the weight average molecular weight obtained by the GPC measurement is preferably from 100,000 to 290,000 in view of rubber elasticity and moldability. When the weight average molecular weight is less than 100,000, tensile strength may decrease. In contrast, when the weight average molecular weight is more than 290,000, extrusion moldability may deteriorate. Therefore, both cases are not preferred.

The content of a styrene unit in the SIS is preferably from 10 to 30% by mass in view of pressure-sensitive adhesion, adhesion and rubber elasticity.

In the SIS, a molar ratio of an isoprene unit to a styrene unit (isoprene unit/styrene unit) is preferably from 90/10 to 70/30. In the SIS, the polymerization degree of each block is preferably from about 500 to 5,000 for an isoprene block, or preferably from about 50 to 1,500 for a styrene block, in view of the rubber elasticity and handling.

The SIS can be obtained by a conventional polymerization method of a vinyl-based compound and, for example, it can be obtained by a living cationic polymerization method.

<Styrene-Isobutylene Diblock Copolymer>

Since an isobutylene block of the SIB is a soft segment, a polymer composition containing the SIB is easily vulcanization-bonded with a rubber component. Therefore, when the polymer composition containing the SIB is used as the inner liner, the inner liner is excellent in adhesion with an adjacent rubber constituting a carcass or an insulation, and thus a pneumatic tire having excellent durability can be obtained.

In the polymer component, the total of the content of the SIB and the content of the styrene-isoprene-styrene triblock copolymer described above is from 1 to 50% by mass. When the total of the contents of the SIS and the SIB is less than 1% by mass, in the case a polymer composition for an inner liner containing the polymer component is used as an inner liner, adhesion with an adjacent rubber may deteriorate. When the content exceeds 50% by mass, air permeation resistance may deteriorate. The content is more preferably from 5 to 45% by mass.

It is preferred to use a linear one as the SIB in view of rubber elasticity and adhesion.

Although there is no particular limitation on the molecular weight of the SIB, the weight average molecular weight obtained by the GPC measurement is preferably from 40,000 to 120,000 in view of rubber elasticity and moldability. When the weight average molecular weight is less than 40,000, tensile strength may decrease. In contrast, when the weight average molecular weight is more than 120,000, extrusion moldability may deteriorate. Therefore, both cases are not preferred.

The content of a styrene unit in the SIB is preferably from 10 to 35% by mass in view of pressure-sensitive adhesion, adhesion and rubber elasticity.

In the SIB, a molar ratio of an isobutylene unit to a styrene unit (isobutylene unit/styrene unit) is preferably from 90/10 to 65/35. In the SIB, the polymerization degree of each block is preferably from about 300 to 3,000 for an isobutylene block, or preferably from about 10 to 1,500 for a styrene block, in view of the rubber elasticity and handling.

The SIB can be obtained by a conventional polymerization method of a vinyl-based compound and, for example, it can be obtained by a living cationic polymerization method.

For example, International Publication No. WO 2005/033035 discloses a production method in which methylcyclohexane, n-butyl chloride and cumyl chloride are charged in a stirrer, cooled to −70° C. and reacted for 2 hours, and then the reaction is terminated by adding a large amount of methanol and the reaction solution is vacuum-dried at 60° C. to obtain an SIB.

<Ethylene-Vinyl Alcohol Copolymer>

It is preferred that the polymer component further contains 1 to 30% by mass of an ethylene-vinyl alcohol copolymer (hereinafter may also be referred to as an EVOH).

When the content of the ethylene-vinyl alcohol copolymer in the polymer component is less than 1% by mass, air shielding properties may deteriorate. When the content exceeds 30% by mass, handiness increases and flexural fatigue properties may deteriorate. The content is more preferably from 5 to 20% by mass.

The ethylene-vinyl alcohol copolymer is preferably an ethylene-vinyl alcohol copolymer represented by the following general formula (I):

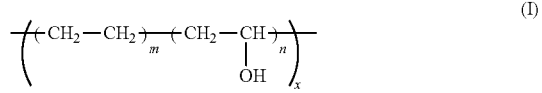

wherein m and n each independently represent 1 to 100, and x represents 1 to 1,000.

Compatibility with other compounding agents in the polymer component is satisfactorily imparted by the ethylene-derived moiety of the ethylene-vinyl alcohol copolymer, and the ethylene-vinyl alcohol copolymer can exist in a fine dispersion size in the unvulcanized polymer sheet. The ethylene-vinyl alcohol copolymer has satisfactory gas barrier properties due to contribution of the vinyl alcohol-derived moiety. In one embodiment of the present invention, when the ethylene-vinyl alcohol copolymer having excellent gas barrier properties is dispersed in the form of islands in a fine size in the unvulcanized polymer sheet, satisfactory gas barrier properties are exhibited even when a thin inner liner layer is formed. Thus, it is possible to perform weight saving of the tire, and the effect of improving fuel efficiency is obtained.

In the general formula (I), m and n are adjusted to 1 or more so as to constitute an ethylene-vinyl alcohol copolymer. When m and n are 100 or less, it is possible to obtain an ethylene-vinyl alcohol copolymer that has both compatibility with other compounding agents in the polymer component and gas barrier properties. Since compatibility with other compounding agents in the polymer component is further improved, m is more preferably adjusted to 5 or more. Since gas barrier properties are further improved, n is more preferably adjusted to 5 or more. Since it is hard to fail to exhibit gas barrier properties due to the vinyl alcohol-derived moiety, m is more preferably adjusted to 95 or less, and still more preferably 80 or less. Since it is hard to fail to exhibit satisfactory compatibility with other compounding agents in the polymer component due to the ethylene-derived moiety, n is more preferably adjusted to 95 or less, and still more preferably 80 or less.

In the general formula (I), x is adjusted to 1 or more so as to constitute the ethylene-vinyl alcohol copolymer. When x is 1,000 or less, kneadability in the production of the unvulcanized polymer sheet is ensured and an unvulcanized polymer sheet containing an ethylene-vinyl alcohol copolymer dispersed uniformly therein is obtained. Since satisfactory compatibility with other compounding agents in the polymer component and gas barrier properties are exhibited, x is more preferably adjusted to 10 or more. In view of satisfactory kneadability, x is more preferably adjusted to 500 or less, and still more preferably 100 or less.

The ethylene-vinyl alcohol copolymer represented by the general formula (I) preferably contains 25 to 50 mol % of an ethylene unit in view of compatibility with the polymer.

The ethylene-vinyl alcohol copolymer represented by the general formula (I) may be contained in the polymer composition in a state of being copolymerized with other components. In this case, the content of the ethylene-vinyl alcohol copolymer means the content of the structure moiety represented by the general formula (II).

The molecular structure of the ethylene-vinyl alcohol copolymer can be confirmed, for example, by an infrared absorption spectrum (IR) and a nuclear magnetic resonance spectrum (NMR).

<Other Compounding Agents>

In one embodiment of the present invention, it is preferred that the polymer composition for an inner liner further contains a compatibilizing agent represented by the following general formula (II):

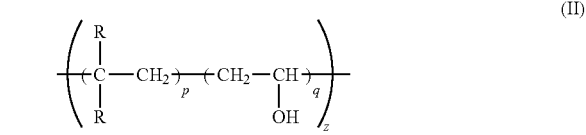

wherein R represents an alkyl group, p and q each independently represent 1 to 100, and z represents 1 to 5. The compatibilizing agent has the action of further enhancing compatibility of an ethylene-vinyl alcohol copolymer and the other compounding agents in the polymer component. When p and q in the general formula (II) each represent 1 or more, the action as the compatibilizing agent is satisfactory. When p and q each represent 100 or less, the compatibilizing agent shows satisfactory dispersibility in the polymer component. p is more preferably 5 or more, and more preferably 95 or less, and still more preferably 80 or less, q is more preferably 5 or more, and more preferably 95 or less, and still more preferably 80 or less.

z in the general formula (II) is adjusted to 1 or more so as to constitute a block copolymer. In view of satisfactory dispersibility of the compatibilizing agent in the polymer component, z is preferably adjusted to 5 or less. z is more preferably 2 or more, and more preferably 4 or less.

The content of the compatibilizing agent represented by the general formula (II) in the polymer composition is preferably adjusted within a range from 0.1 to 4.8% by mass. When the content is 0.1% by mass or more, the satisfactory effect as the compatibilizing agent is exhibited. When the content is 4.8% by mass or less, it is possible to satisfactorily prevent deterioration of basic performance such as mechanical strength in the inner liner layer of the tire. The content is more preferably adjusted to 0.5% by mass or more, still more preferably 1.0% by mass or more, and even more preferably 1.5% by mass or more, and more preferably adjusted to 4.3% by mass or less, still more preferably 3.8% by mass or less, and even more preferably 3.4% by mass or less.

The polymer composition can contain various compounding agents and additives, that are added to a polymer composition for tires or a conventional polymer composition, such as other reinforcing agents, vulcanization agents, vulcanization accelerators, various oils, antioxidants, softeners, plasticizers and coupling agents. The contents of these compounding agents and additives can be adjusted to appropriate amounts.

<Physical Properties of Polymer Composition for Inner Liner>

The Shore A hardness of the polymer composition for an inner liner after vulcanization is preferably within a range from 25 to 75. When the Shore A hardness is 25 or more, the polymer composition for an inner liner has satisfactory mechanical strength. When the Shore A hardness is 75 or less, it is possible to prevent deterioration of durability due to too high a hardness of the polymer sheet for an inner liner. The Shore A hardness is more preferably 40 or more, still more preferably 42 or more, and even more preferably 45 or more, and more preferably 65 or less, and still more preferably 60 or less. The Shore A hardness is the value measured in accordance with JIS K 6253 "How to Determine Hardness of Vulcanized Rubber and Thermoplastic Rubber".

The specific gravity of the polymer composition for an inner liner is preferably 1.70 or less. When the specific gravity is 1.70 or less, a satisfactory effect of improving fuel efficiency due to weight saving of the tire is exerted. The specific gravity is more preferably 1.40 or less, and still more preferably 1.20 or less.

<Method for Producing Polymer Composition for Inner Liner>

An unvulcanized product of a polymer composition for an inner liner can be produced by a conventionally known method and examples of the method include a method in which the above materials are weighed according to a predetermined formulation and then kneaded at 100 to 250° C. for 5 to 60 minutes using a rubber kneader such as an open roll or a Banbury mixer.

<Structure of Pneumatic Tire>

A pneumatic tire 1 in one embodiment according to the present invention will be described with reference to FIG. 1.

Pneumatic tire 1 can be used as tires for passenger cars, trucks and buses, and heavy duty equipment. Pneumatic tire 1 includes a tread part 2, a side wall part 3 and a bead part 4. Furthermore, a bead core 5 is embedded in bead part 4. Also provided are a carcass 6 whose ends are respectively folded around bead core 5 and latched, that is provided from one bead part 4 to the other bead part, and a belt layer 7 composed of two plies outside a crown part of carcass 6. An inner liner 9 extending from one bead part 4 to the other bead part 4 is disposed on the tire radial inner surface of carcass 6. Belt layer 7 is disposed so that cords are mutually intersected between two plies composed of a steel cord or an aramid fiber cord at an angle of usually 5 to 30° in a tire circumferential direction. Regarding the carcass, organic fiber cords made of polyester, nylon or aramid are arranged at an angle of about 90° in a tire circumferential direction, and a bead apex 8 extending from the top of bead core 5 in a side wall direction is disposed in the region surrounded by the carcass and the folded part thereof.

The thickness of inner liner 9 is preferably within a range from 0.05 to 0.5 mm in view of satisfactory air permeation resistance and an improvement in fuel efficiency due to weight saving of the tire.

EXAMPLES

Examples 1 to 18, Comparative Examples 1 to 10

Production of SIB

In a 2 L reaction vessel equipped with a stirrer, 589 mL of methylcyclohexane (dried over molecular sieves), 613 mL of n-butyl chloride (dried over molecular sieves) and 0.550 g of cumyl chloride were added. After cooling the reaction vessel to −70° C., 0.35 mL of α-picoline(2-methylpyridine) and 179 mL of isobutylene were added. Furthermore, 9.4 mL of titanium tetrachloride was added and the polymerization was initiated, and then the solution was reacted for 2.0 hours while stirring at −70° C. Next, 59 mL of styrene was added to the reaction vessel and the reaction was continued for 60 minutes, and then the reaction was terminated by adding a large amount of methanol. After removing the solvent from the reaction solution, a polymer was dissolved in toluene and washed twice with water. This toluene solution was added to the methanol mixture, thereby precipitating a polymer, and the resultant polymer was dried at 60° C. for 24 hours to obtain a styrene-isobutylene diblock copolymer.

(Production of Polymer Composition)

According to each formulation shown in Table 1, various compounding agents were charged in a twin screw extruder (screw diameter: ϕ50 mm, L/D: 30, cylinder temperature: 220° C.) and pelletized, and then a polymer sheet for an inner liner made of a polymer composition for an unvulcanized inner liner was produced by a T die extruder (screw diameter: ϕ80 mm, L/D: 50, die lip width: 500 mm, cylinder temperature: 220° C., film gauge: 0.3 mm). Using the polymer sheet, the following tests were performed.

<Peeling Test>

In accordance with JIS K 6256 "Vulcanized Rubber and Thermoplastic Rubber—How to determine Adhesion", a peeling test was performed. First, the above 2 mm thick polymer sheet, a 2 mm thick rubber sheet (formulation: NR/SBR/carbon black=50/50/50) and a reinforced canvas cloth were laid one upon another in the above order, followed by heating under pressure at 170° C. for 12 minutes to obtain a test piece for peeling. Using the resultant test piece, a peeling test was performed and an adhesive power of the inner liner and the rubber sheet (IL/case) was measured. The size of the test piece was 25 mm in width and the peeling test was performed at room temperature of 23° C. Using the following calculation equation, the peel power index was calculated (the value of Comparative Example 1 is regarded as a reference (100)). The larger the value is, the more excellent the adhesion is.

was applied. After standing at room temperature for 90 days, a drop rate of an air pressure was calculated. The results are shown in Table 1.

<Evaluation Results>

TABLE 1

|  |  | Examples |  |  |  |  |  |  |  |  |  |  |  |  |  |  |
|---|---|---|---|---|---|---|---|---|---|---|---|---|---|---|---|---|
|  |  | 1 | 2 | 3 | 4 | 5 | 6 | 7 | 8 | 9 | 10 | 11 | 12 | 13 | 14 | 15 |
| Compounding agent (parts by mass) | SIBS (Note 1) | 95 | 80 | 50 | 95 | 80 | 50 | 90 | 80 | 70 | 50 | 90 | 80 | 70 | 50 | 80 |
|  | SIS (Note 2) | 5 | 20 | 50 | — | — | — | 9 | 15 | 10 | 20 | — | — | — | — | 10 |
|  | SIB (Note 3) | — | — | — | 5 | 20 | 50 | — | — | — | — | 9 | 15 | 10 | 20 | 10 |
|  | EVOH (Note 4) | — | — | — | — | — | — | 1 | 5 | 20 | 30 | 1 | 5 | 20 | 30 | — |
|  | Chlorobutyl (Note 5) | — | — | — | — | — | — | — | — | — | — | — | — | — | — | — |
|  | Filler (Note 6) | — | — | — | — | — | — | — | — | — | — | — | — | — | — | — |
| Evaluation | Peel power index | 20 | 40 | 80 | 22 | 44 | 84 | 25 | 31 | 27 | 33 | 26 | 32 | 28 | 34 | 41 |
|  | Static air pressure drop rate (%/month) | 2.5 | 2.8 | 3.3 | 2.5 | 2.7 | 3.2 | 2.5 | 2.3 | 2 | 1.9 | 2.5 | 2.3 | 1.9 | 1.8 | 2.8 |
|  | JIS-A hardness | 48 | 45 | 40 | 47 | 44 | 39 | 48 | 54 | 68 | 75 | 48 | 53 | 67 | 74 | 45 |

|  |  | Examples |  |  | Comparative Examples |  |  |  |  |  |  |  |  |  |
|---|---|---|---|---|---|---|---|---|---|---|---|---|---|---|
|  |  | 16 | 17 | 18 | 1 | 2 | 3 | 4 | 5 | 6 | 7 | 8 | 9 | 10 |
| Compounding agent (parts by mass) | SIBS (Note 1) | 50 | 85 | 50 | — | 100 | 40 | 40 | 40 | 20 | 40 | 20 | 40 | 40 |
|  | SIS (Note 2) | 25 | 5 | 20 | — | — | 60 | — | 20 | 40 | — | — | 30 | 20 |
|  | SIB (Note 3) | 25 | 5 | 20 | — | — | — | 60 | — | — | 20 | 40 | 30 | 20 |
|  | EVOH (Note 4) | — | 5 | 10 | — | — | — | — | 40 | 40 | 40 | 40 | — | 20 |
|  | Chlorobutyl (Note 5) | — | — | — | 100 | — | — | — | — | — | — | — | — | — |
|  | Filler (Note 6) | — | — | — | 60 | — | — | — | — | — | — | — | — | — |
| Evaluation | Peel power index | 83 | 30 | 33 | 100 | 5 | 100 | 110 | 31 | 69 | 32 | 70 | 100 | 91 |
|  | Static air pressure drop rate (%/month) | 3.3 | 2.2 | 1.9 | 3.7 | 2.3 | 4 | 3.9 | 1.7 | 1.7 | 1.6 | 1.6 | 5.3 | 3.7 |
|  | JIS-A hardness | 41 | 54 | 58 | 55 | 50 | 38 | 37 | 80 | 78 | 79 | 77 | 37 | 76 |

(Note 1)
SIBS: "SIBSTAR 102T" (Shore A hardness of 25, styrene unit content of 25% by mass) manufactured by Kaneka Corporation
(Note 2)
SIS: "D1161JP" (content of styrene unit: 15% by mass) manufactured by Kraton Polymers
(Note 3)
SIB: prepared in the above (Preparation of SIB) (content of styrene unit: 15% by mass)
(Note 4)
EVOH: "EVAL E105" (content of ethylene unit: 44 mol %)" manufactured by Kuraray Co., Ltd.
(Note 5)
Chlorobutyl: "Exxon chlorobutyl 1068" manufactured by Exxon Mobil Corporation
(Note 6)
Filler: "SEAST V" (N660, $N_2SA$ of 27 $m^2/g$) manufactured by Tokai Carbon Co., Ltd.

(Peel power index)=(Adhesive power of each formulation)/(Adhesive power of Comparative Example 1)×100

The results are shown in Table 1.

<Hardness>

In accordance with JIS K 6253 "Vulcanized Rubber and Thermoplastic Rubber—How to Determine Hardness", a test piece was made and the hardness was measured under the condition of room temperature of 23° C. The results are shown in Table 1.

(Production of Tire)

A 195/65R15 tire was produced by applying the above polymer sheet for an inner liner as an inner liner portion of a tire and subjected to press molding at 170° C. for 20 minutes. Using the tire, a static air pressure drop test was performed.

<Static Air Pressure Drop Test>

The 195/65R15 steel radial PC tire was mounted to HS standard rim (15×6JJ) and an initial air pressure of 300 Kpa Examples 1 to 3 give polymer compositions for an inner liner in which a polymer component contains 95 to 50% by mass of an SIBS and 5 to 50% by mass of an SIS, and pneumatic tires. Adhesion power was improved as compared with Comparative Example 2 in which only an SIBS was used as a polymer. Static air pressure drop rate was also satisfactory.

Examples 4 to 6 give polymer compositions for an inner liner in which a polymer component contains 95 to 50% by mass of an SIBS and 5 to 50% by mass of an SIB, and pneumatic tires. Adhesion power was improved as compared with Comparative Example 2 in which only an SIBS was used as a polymer. Static air pressure drop rate was also satisfactory.

Examples 7 to 10 give polymer compositions for an inner liner in which a polymer component contains 90 to 50% by mass of an SIBS, 9 to 20% by mass of an SIS and 1 to 30% by mass of an EVOH. Adhesive power was improved as compared with Comparative Example 2 in which only an SIBS was used as a polymer. Static air pressure drop rate was also satisfactory.

Examples 11 to 14 give polymer compositions for an inner liner in which a polymer component contains 90 to 50% by mass of an SIBS, 9 to 20% by mass of an SIB and 1 to 30% by mass of an EVOH, and pneumatic tires. Adhesive power was improved as compared with Comparative Example 2 in which only an SIBS was used as a polymer. Static air pressure drop rate was also satisfactory.

Examples 15 to 16 give polymer compositions for an inner liner in which a polymer component contains 80 to 50% by mass of an SIBS, 10 to 25% by mass of an SIS and 10 to 25% by mass of an SIB, and pneumatic tires. Adhesive power was improved as compared with Comparative Example 2 in which only an SIBS was used as a polymer. Static air pressure drop rate was also satisfactory.

Examples 17 to 18 give polymer compositions for an inner liner in which a polymer component contains 85 to 50% by mass of an SIBS, 5 to 20% by mass of an SIS, 5 to 20% by mass of an SIB and 5 to 10% by mass of an EVOH, and pneumatic tires. Adhesive power was improved as compared with Comparative Example 2 in which only an SIBS was used as a polymer. Static air pressure drop rate was also satisfactory.

Comparative Example 1 shows a polymer composition for an inner liner in which 100% by mass of chlorobutyl was used as a polymer component, and a pneumatic tire. Adhesive power was excellent as compared with examples, but static air pressure drop rate was poor. Adhesive power was improved as compared with Comparative Example 2 in which only an SIBS was used as a polymer. Static air pressure drop rate was also satisfactory.

Comparative Example 2 gives a polymer composition for an inner liner in which 100% by mass of an SIBS was used as a polymer component, and a pneumatic tire. Static air pressure drop rate was equivalent to those of examples, but adhesion was very poor.

Comparative Example 3 gives a polymer composition for an inner liner in which a polymer component contains 40% by mass of an SIBS and 60% by mass of an SIS, and a pneumatic tire. Adhesive power was excellent, but static air pressure drop rate was inferior as compared with examples.

Comparative Example 4 gives a polymer composition for an inner liner in which a polymer component contains 40% by mass of an SIBS and 60% by mass of an SIB, and a pneumatic tire. Adhesive power was excellent, but static air pressure drop rate was inferior as compared with examples.

Comparative Examples 5 to 6 give polymer compositions for an inner liner in which a polymer component contains 40 to 20% by mass of an SIBS, 20 to 40% by mass of an SIS and 40% by mass of an EVOH, and pneumatic tires. Adhesion and static air pressure drop rate were excellent, but durability may deteriorate because of high hardness.

Comparative Examples 7 to 8 give polymer compositions for an inner liner in which a polymer component contains 40 to 20% by mass of an SIBS, 20 to 40% by mass of an SIB and 40% by mass of an EVOH, and pneumatic tires. Adhesion and static air pressure drop rate were excellent, but durability may deteriorate because of high hardness.

Comparative Example 9 gives a polymer composition for an inner liner in which a polymer component contains 40% by mass of an SIBS, 30% by mass of an SIS and 30% by mass of an SIB, and a pneumatic tire. Adhesive power was excellent, but static air pressure drop rate was inferior as compared with examples.

Comparative Example 10 gives a polymer composition for an inner liner in which a polymer component contains 40% by mass of an SIBS, 20% by mass of an SIS, 20% by mass of an SIB and 20% by mass of an EVOH, and a pneumatic tire. Adhesive power was excellent, but static air pressure drop rate was inferior as compared with examples. Furthermore, durability may deteriorate because of high hardness.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A polymer composition for an inner liner comprising
a styrene-isobutylene-styrene triblock copolymer in an amount of 90 to 50% by mass of a total polymer content,
a styrene-isobutylene diblock copolymer, which is linear, contains 10 to 35% by mass of a styrene unit, and has a weight average molecular weight of 40,000 to 120,000, in an amount of 9 to 20% by mass of a total polymer component, and
an ethylene-vinyl alcohol copolymer in an amount of 1 to 30% by mass of a total polymer component.

2. The polymer composition for an inner liner according to claim 1, wherein said styrene-isobutylene-styrene triblock copolymer contains 10 to 30% by mass of a styrene unit and has a weight average molecular weight of 50,000 to 400,000.

3. The polymer composition for an inner liner according to claim 1, wherein said ethylene-vinyl alcohol copolymer contains 25 to 50 mol % of an ethylene unit.

4. A pneumatic tire having an inner liner comprising the polymer composition according to claim 1.

5. A pneumatic tire having an inner liner comprising the polymer composition according to claim 2.

6. A pneumatic tire having an inner liner comprising the polymer composition according to claim 3.

7. The polymer composition for an inner liner according to claim 1, wherein said polymer component additionally contains a styrene-isoprene-styrene triblock copolymer and the total amount of said styrene-isoprene-styrene triblock copolymer and the styrene-isobutylene diblock copolymer is 9 to 20% by mass of the total polymer component.

8. The polymer composition for an inner liner according to claim 7, wherein said styrene-isoprene-styrene triblock copolymer contains 10 to 30% by mass of a styrene unit and has a weight average molecular weight of 100,000 to 290,000.

9. The polymer composition for an inner liner according to claim 8, wherein said styrene-isobutylene-styrene triblock copolymer contains 10 to 30% by mass of a styrene unit and has a weight average molecular weight of 50,000 to 400,000.

10. A pneumatic tire having an inner liner comprising the polymer composition according to claim 7.

11. A pneumatic tire having an inner liner comprising the polymer composition according to claim 8.

12. A pneumatic tire having an inner liner comprising the polymer composition according to claim 9.

* * * * *